Feb. 26, 1952  A. H. HOFBERG  2,587,158
METAL DETECTOR
Filed Feb. 27, 1948
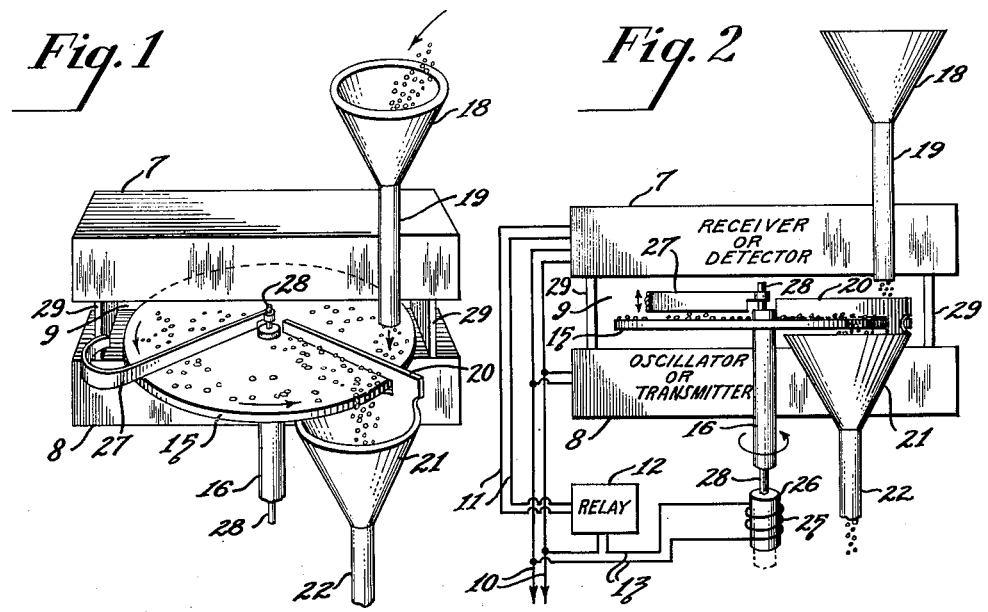
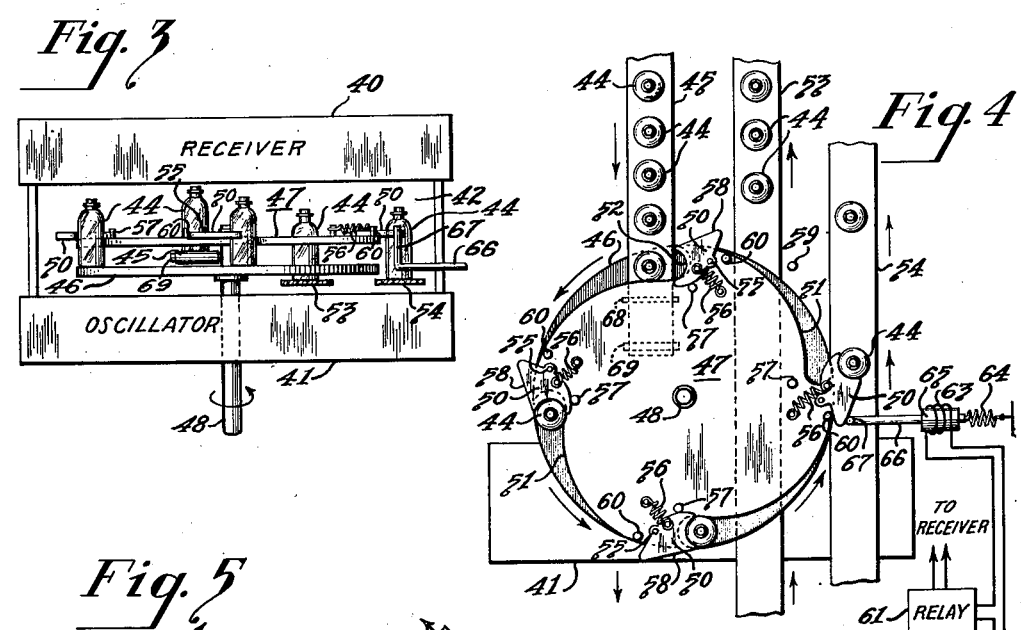
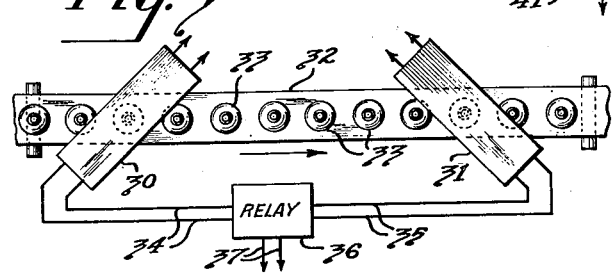
INVENTOR
Alf H. Hofberg
BY
ATTORNEY Patented Feb. 26, 1952

2,587,158

UNITED STATES PATENT OFFICE 2,587,158

METAL DETECTOR

Alf H. Hofberg, Medford, N. J., assignor to Radio Corporation of America, a corporation of Delaware Application February 27, 1948, Serial No. 11,540

2 Claims. (Cl. 209—81)

The present invention relates to metal detectors, and more particularly to an improved method and means for the production testing or inspecting of materials for metal and other electro-conductive contamination to which metal detectors are responsive.

It has been found that in the detection of small metal and other electro-conductive particles which may provide a highly undesirable form of contamination for various materials such as foods, beverages and medicines, for example, the angular misplacement of such particles in an object or in materials under test may be such that they fail to provide a response in the usual metal detector when inspected thereby. That is, a metal or other electro-conductive particle moved through the aperture or field of a metal detector in a straight line, as on a conveyor belt, may be oriented unfavorably with respect to the field of the detector and so be passed without detection.

It has further been found that for each type of metal, both magnetic and nonmagnetic, unfavorable orientation relative to the axis of the detector field or aperture occurs most often if the metal particles, such as wire clippings, are elongated to any appreciable extent in form.

When passed through the usual metal detector aperture or field, magnetic particles of elongated form are unfavorably placed for detection when the axis of the particle lies at a right angle to the direction of movement through the field, which direction is normal to the axis or plane of the field whereas nonmagnetic metallic and other electro-conductive particles of elongated form are likewise unfavorably placed for detection when conveyed in the same manner, with their axes parallel to the direction of movement through the field or aperture. It is obvious, therefore, that for the complete detection of metal contamination in foods, beverages, medicines and the like, means must be provided for effective detection of any slight metal or conductive particles which may be present, in any form and size and whether oriented favorably or unfavorably with respect to the detection field.

Accordingly, it is a primary object of this invention, to provide an improved method and means for testing materials for small metal and other electro-conductive contamination which corrects for any angular misplacement of such particles, whereby their presence may be detected in conjunction with a suitable metal detector having an aperture through which the material to be tested may be passed continuously, thereby to expedite the testing operation and the permit its adaptation to production lines and the like.

It is also an object of this invention, to provide an improved method and means for testing materials for metal and other electro-conductive contamination, which provides for feeding material to be tested through a metal detector in different directions with respect to the plane or axis of the field, whereby any metal or conductive particles therein, such as an elongated particle, can not be so unfavorably oriented in all portions of the field that it may produce little or no effect upon the metal detector.

It is a still further object of the invention, to provide an improved test and inspection apparatus for conveying material to be tested in a circular path through a metal detector aperture or field, whereby metal particles therein must pass through the test area at successively different angles with respect to the field of the detector, and enter and leave the field at opposite angles with respect to the field axis, thereby effectively providing for double detection on the particle as it moves through the field.

The invention is particularly adapted for the testing of both packaged and unpackaged material as the case may be, which may be adapted for handling on a moving belt or production line, whereby continuous testing may be effected.

It is also a further object of the invention, to provide an improved system for testing materials for metal contamination and the like which effectively provides double detection as above stated, for any metal or conductive particles present in the material while moving in a continuous path, as in a production line, and which further provides for the automatic acceptance or rejection of the material, whereby the system may be made substantially automatic in operation.

The invention will, however, be further understood from the following description when considered in connection with the accompanying drawing, and its scope will be pointed out in the appended claims.

In the drawing:

Figure 1 is a view in perspective, of an improved apparatus for testing material, in accordance with the invention, Figure 2 is a side view of the apparatus of Figure 1, showing further details of the invention, Figure 3 is a side view of apparatus for testing packaged material for metal contamination, further in accordance with the invention, being a modification of the embodiment shown in Figures 1 and 2, Figure 4 is a plan view of the apparatus of Figure 3, with a portion removed to show further details of the form of the invention illustrated in Figure 3, and Figure 5 is a plan view of an additional apparatus embodying the invention, being a further modification adapted for a production line application of the straight-line conveyor type.

Referring to Figures 1 and 2, a metal detector system for testing small medicinal pills and the like comprises two spaced metal detector units or elements indicated at 7 and 8, which may be of any suitable construction providing a metal detection aperture or space 9 between them through which material may be passed for inspection.

In the present example, the unit or element 7 may be considered to be a receiver or detector of any well known construction which receives energy through the field or aperture 9 from the unit or element 8, which may be considered to be the oscillator or transmitter unit for the detector. As indicated in Figure 2, these units may be energized by connection with suitable alternating current supply leads indicated at 10.

As is well known, the operation of the type of metal detector shown is such that the output from the transmitter or oscillator is balanced and neutralized, except when the field in the space 9 is disturbed by the presence of a metallic or other electro-conductive particle, such as carbon, for example, at which time the energy from the transmitter or oscillator is caused to actuate the receiver or detector and to provide an output signal of any suitable form.

The detection of metal as referred to herein thus includes all substances to which a metal detector is responsive and which may be present in materials adapted for inspection or test thereby.

In the present example, the output signal is conveyed from the detector through a pair of leads indicated at 11 to a sensitive relay 12 connected with said leads. The relay in turn, may control the application of energy to a rejection circuit 13 which is connected to the supply leads 10 through the relay.

In accordance with the invention, the material to be tested is caused to move through successive portions of the field 9 in a circular path, whereby the contaminating elements therein may be detected upon entering, passing through or leaving the aperture, and whereby the flow of material may be continuous for high speed inspection and production.

For conveying small articles, such as pills, through the aperture, a rotary turntable disk or carrier element 15 is provided which rotates on suitable means such as a fixed axis 16, which is vertical in the present example, in such a manner that a peripheral portion or a portion of one half thereof passes through the aperture or field of the detector in a plane substantially normal to the axis or the plane of the axis of the field, which is also vertical in the present example.

Furthermore, considering the plane of the field as extending longitudinally through the units 7 and 8, it will be seen that movement of material on the disk carrier element or turntable, will cause such material to pass through the plane in one direction and again through the plane in the opposite direction between the time it enters and the time it leaves the field. Thus, if a metal or conductive particle is oriented unfavorably for detection in one portion of the field it must be oriented properly in the opposite portion of the field and before leaving, whereby it may be detected.

In the present example, for handling pills and like materials, a delivery funnel 18 is provided, through which the pills are passed as shown and conveyed downwardly through a connecting delivery tube or conductor 19 to a point adjacent the periphery of the turntable which lies just outside the field of the detector. As the pills are dropped on the carrier turntable they are carried in through the field in a continuously moving stream, the direction of which changes continuously throughout the field, and upon leaving the field are picked up by a discharge bar or guide 20 which extends from a point near the center of the turntable non-radially to the periphery thereof, and terminates in a second discharge funnel indicated at 21 tapering to an output or discharge pipe 22 for the accepted product.

In case the metal detector operates in response to a metallic or conducting particle in one or more of the pills, the relay 12 connected with the output circuit 11, may operate to control the application of energy to a suitable reject coil 25 connected with the circuit 13. In the present example, to insure that the apparatus will reject upon current failure, the reject coil 25 is normally energized, that is the relay is normally closed and is arranged to open in response to energy from the detector through the control circuit 11.

The reject coil 25 is arranged as a solenoid in the present example, having a core 26 which is held in the position shown, normally to maintain a reject bar 27 in a raised position through operation of a slidably mounted connection rod 28 extending through the rotary carrier axis. In response to operation of the detector and relay, the reject bar, which does not rotate, is arranged to fall in the path of the defective material just after detection, and to sweep it outwardly and off the carrier as the latter revolves, as will be seen from an inspection of the arrangement more clearly shown in Figure 1.

It will be noted that the detector units 7 and 8 are separated by suitable spacer blocks 29, whereby the relative positions of the two units are maintained fixed. It is essential that the alignment and relative positions of the detector and oscillator elements be rigidly maintained in operation.

Furthermore, the spacer blocks 29 are constructed of nonmagnetic material, since they lie within the aperture or field of the detector and would otherwise reduce the sensitivity and effectiveness of the detector. For the same reason, it is necessary to construct the conveyor disk 15 and all associated parts, including the delivery guide bar 20 and reject bar 27, the shaft 16 and reject rod 28, all of nonmetallic and nonconducting material. Any suitable plastic material may be used for this purpose, which may be molded or otherwise shaped or formed, and which possesses the necessary strength and rigidity.

Upon passage of the defective material, the relay 12 is again deenergized and closes the circuit 13, thereby energizing the reject coil 25 and raising the solenoid armature 26, the connecting rod 28 and the reject gate or bar 27, to the position shown more clearly in Figure 2. The apparatus then continues to function until further defective material is detected, when the operation is repeated.

From the foregoing description, it will be seen that the invention provides for placing objects or materials to be tested on a rotating or other carrier means which passes through the test area of a metal detector at successively different angles with respect to the axis of the field in said area, thus assuring that any metal particle such as a short wire particle cannot be so oriented that it produces no detectable effect on the detector, that is, it becomes favorably oriented for detection in at least one portion of the field.

Thus the angle of misplacement of metallic or other conductive substances in an object under test is overcome by rotating the object within the test field in a plane at substantially right angles to the axis of the aperture or detector field. Furthermore, the disk provides effectively for double inspection of the material since the material is carried into and then back out of the field of the metal detector at different and substantially opposite angles.

This effect can to a degree, be duplicated by using two metal detectors, for example, as indicated in Figure 5 at 30 and 31, on a conventional conveyor belt line indicated at 32, which is arranged to carry packaged material such as the bottles indicated at 33 containing material to be tested. When using two metal detectors it will be noted that they are set at opposite angles to each other and spaced to provide two spaced portions for the detector field. Thus, the production line or conveyor passes through the detectors in a tandem, whereby if the angle of a particle to be detected is unfavorable to one metal detector, is necessarily more favorable to the other.

In this case the output circuits 34 and 35 from the two detectors are connected to a relay 36 for joint operation thereof to control any suitable indicator circuits through connection with the relay contact leads indicated at 37, for example, in the same manner as shown in Figure 2, to reject the material, or to indicate the presence of metal and the like, as may be desired.

In the embodiment shown in Figure 5, the material to be tested passes through the metal detection field in a straight line, with the successive portions of the field lying at different angles with respect to the axis of movement of the material at different points in the field. This is conveniently arranged, as shown, by utilizing two metal detectors in tandem on the same belt line and in spaced relation to each other along the path of movement of the line and with the angles of the detection field sections substantially opposite to each other, whereby contamination of the material by unfavorably oriented particles may effectively be detected as they enter and leave the field at different angles with respect thereto.

Referring now to Figures 3 and 4, a present preferred modification of the rotary system of Figures 1 and 2 is shown as arranged for the further handling and inspection of packaged materials in a continuous production line and to accept or reject the inspected material.

In the embodiment shown, a receiver or detector unit 40 is mounted in spaced relation to an oscillator or transmitter unit 41 to provide an inspection field or aperture 42 between them as in the preceding embodiment, the aperture here being wider for the purpose of passing the packaged material such as a line of bottles or other nonmetallic containers 44 through the aperture. The bottles are fed forwardly and up to the inspection device on a suitable moving conveyor 45 which passes under a guide rod 68 and over a return roller 69 in the aperture above a rotary turntable or carrier 46 and below a second rotary carrier or pickup plate 47. The rotary carrier elements 46 and 47 are mounted vertically, one above the other in spaced relation, and are secured to a vertical drive shaft 48 to rotate together in spaced horizontal planes through the aperture or field 42 of the detector.

The rotary carrier element thus formed by the double disk structure is arranged to rotate in a plane substantially normal to the plane of the field, that is, the plane of movement of the carrier is substantially at a right angle to the plane of the field, as in the preceding embodiment shown in Figures 1 and 2. Likewise, the circular or rotary carrier projects into the field so that a peripheral portion thereof moves therethrough in a path which is at a constantly changing angle with respect to the axis of the field. By this means, material may be picked up and transported through the field in a curved path, the entrance and exit angles being substantially opposite with respect to the axis of the field. Therefore, the material conveyed is subject to double inspection as in the preceding embodiment, and the present embodiment has similar advantages as pointed out with respect thereto.

In the handling of packages or other articles, such as bottles shown, the lower carrier disk 46 is arranged to carry the articles around a curved or circular path to the delivery point at the opposite side. The articles are placed on the carrier by pivoted pickup fingers 50 mounted on the upper disk member 47 at equally spaced points about the periphery, as shown, being positioned at the base end of each of four curved peripheral notches 51 in and equally spaced along the peripheral edge of the upper disk. The face of each finger is recessed as indicated at 52 to form a pocket at the bottom of each notch for engaging one of the oncoming bottles 44 on the conveyor line 45 and withdrawing it therefrom to a position on the lower disk carrier 46 as the carrier element rotates, in which position it is carried around through the field and outwardly therefrom and delivered either to a return or delivery conveyor 53 or a reject conveyor 54, depending upon whether the detector has indicated any metal contamination in the material being tested.

It will be noted that each of the fingers is pivoted at an intermediate point on the rear edge as indicated at 55, and is held in a normal position at the end of its respective notch by a retracting spring 56 which holds the finger against a fixed stop pin 57. In this position the finger projects radially outwardly from the edge of the carrier disk and is provided with a flat cam surface 58 which strikes a fixed pin 59 adjacent to the conveyor line 53 as the carrier rotates. This drives the finger against a fixed stop 60 on the disk, and as the finger pivots about the fixed point 55 it carries an inspected and accepted package or bottle from the disk carrier 46 to the delivery conveyor 53 which is positioned to move in parallel plane with the conveyor 45 and at a lower level below the rotary carrier disk 46, as appears more fully in Figure 3.

Should the detector indicate the presence in the packaged material of metal or other contaminating substance to which it is responsive, a relay 61, responsive to a change in the condition of operation of the detector, as in the preceding embodiment, is arranged to supply operating energy from supply leads 62 to a solenoid coil 63 operating against a retractile spring 64 to move the solenoid core 65 and an attached trip rod 66 to the left as viewed in the drawing, whereby the end 67 of the trip rod may lie in a position to engage and trip one of the fingers 50 which is bearing the defective package.

This action is shown more fully in Figure 4 wherein one of the fingers 50, is in a position for discharging a bottle from the lower carrier disk 46 onto the reject conveyor 54, the tripping action being the same as that for discharging the bottles onto the outgoing conveyor line 53.

Any other suitable arrangement, however, may be provided for picking up and discharging the bottles but the present arrangement has been found to be effective and has advantages both in simplicity and compactness of arrangement adapted for handling a rapid succession of packages at relatively high speeds in a production line.

It will be noted that the reject conveyor 54 is positioned likewise at a lower level than the rotary carrier disk 46, whereby the packaged material may be picked up and moved directly thereon from the disk with the assistance of gravity. In the present arrangement both conveyors 53 and 54 move in the same plane through the metal detector.

As in the preceding embodiment, all parts and elements of the conveyor which move through the detector field must be nonmetallic and nonconducting and are, therefore, preferably of molded plastic or other suitable material having requisite strength and rigidity for conveying and positioning the materials in the field. Likewise, the containers or bottles for the packaged goods must be of nonconducting material which precludes metals. In the case of the glass bottles, the containers may readily be inspected without difficulty, and in the packaging of other goods suitable nonmetallic and nonconducting substances must be used for most effective detection of metal contamination in the material.

In either embodiment, the metal detection field is utilized to take advantage of metal detection magnetic lines of force having certain components angularly related to other components thereof in that the conveyor is movable successively past said component lines along a preset path such that materials carried thereby will be moved successively through said component lines of force in different angular relations thereto.

From the foregoing description it will be seen that, in accordance with the invention, an improved and effective method and means is provided for the rapid and accurate test or inspection of beverages, foods, medicines and the like material which may be suspected of having any undesired metallic or conducting substances or particles therein, and that detection of such substances or particles may be effected regardless of their orientation in the material with respect to movement of the conveyor. That is, the material is caused to pass through successive portions of the detector field at different angles so that in at least one portion of the field, the undesired particle or particles may be oriented favorably with respect to the field and so may be detected.

In this manner, automatic acceptance or rejection of the material may be provided whether packaged or open and substantially positive detection means are provided for elongated metal particles which normally are difficult to detect. This effective inspection or testing arrangement further includes the advantages of a double detection action on the material, since in each case, the material passes into and out of the field of the detector at substantially opposite angles so that the direction of movement of undesired particles is shifted with respect to the axis of the detection field, thereby effecting a change in the orientation of the particles.

I claim as my invention:

1. Material testing and inspecting apparatus comprising, in combination, a metal detector having a fixed elongated metal detection field, a conveyor including a rotatable non-metallic disk carrier element having a substantially semi-circular peripheral portion extending into said field in a plane normal to a plane through the axis of said field to carry materials to be tested on said peripheral portion through said field in a substantially semi-circular path, conductor means terminating at said disk for delivering material thereto adjacent a point of entry of the disk into the field, material collector means positioned adjacent the disk between a point of exit thereof from the field and said point of entry, a material reject element positioned adjacent the disk at a point between said collector means and said point of exit, and means responsive to operation of said detector for actuating said reject element to remove contaminated material from said disk.

2. Material testing and inspecting apparatus comprising, in combination, a metal detector having a fixed elongated metal detection field, a conveyor including a rotatable nonmetallic disk carrier element having a substantially semi-circular peripheral portion extending into said field in a plane normal to a plane through the axis of said field to carry materials to be tested on said peripheral portion through said field in a substantially semi-circular path, whereby said material is caused to enter and leave said field in said path at opposite angles with respect to the axis thereof and to traverse successive portions of said field at different angles with respect to the axis thereof, thereby to provide favorable orientation of included metallic and other electro-conductive particles for effective detection in at least one portion of said field, receiving conveyor means for the material position adjacent the exit end of said circular path, and a reject device positioned between said exit end of the path and said receiving conveyor means and responsive to operation of the detector for rejecting material containing said particles.

ALF H. HOFBERG.

REFERENCES CITED

The following references are of record in the file of this patent:

UNITED STATES PATENTS

| Number | Name | Date |
|---|---|---|
| Re. 21,927 | Brace | Oct. 21, 1941 |
| 1,973,414 | Miller | Sept. 11, 1934 |
| 2,237,254 | Brookhuysen | Apr. 1, 1941 |
| 2,315,045 | Breitenstein | Mar. 30, 1943 |

FOREIGN PATENTS

| Number | Country | Date |
|---|---|---|
| 284,307 | Great Britain | Jan. 29, 1929 |